United States Patent [19]

Wada et al.

[11] Patent Number: 4,902,457
[45] Date of Patent: Feb. 20, 1990

[54] METHOD FOR MANUFACTURING A POROUS MATERIAL OR A COMPOSITE SINTERED PRODUCT COMPRISING ZIRCONIUM OXIDE AND A CARBIDE

[75] Inventors: Takahiro Wada; Seiji Adachi; Toshihiro Mihara, all of Osaka, Japan

[73] Assignee: Matsushita Electric Industrial Co., Ltd., Japan

[21] Appl. No.: 41,810

[22] Filed: Apr. 7, 1987

[30] Foreign Application Priority Data

Apr. 7, 1986 [JP] Japan .................. 61-79705
Sep. 29, 1986 [JP] Japan .................. 61-230309
Dec. 19, 1986 [JP] Japan .................. 61-304195
Dec. 19, 1986 [JP] Japan .................. 61-304197

[51] Int. Cl.$^4$ .................................................. C04B 35/64
[52] U.S. Cl. .................................... 264/43; 264/25; 264/27; 264/60; 264/63; 264/80
[58] Field of Search .................. 264/60, 80, 43, 25, 264/27, 63

[56] References Cited

U.S. PATENT DOCUMENTS 4,217,948  8/1980  Merzhanov et al. ............... 264/60
4,642,218  2/1987  Rice .................................. 264/80

FOREIGN PATENT DOCUMENTS 0165707  12/1985  European Pat. Off. .

Primary Examiner—James Derrington
Attorney, Agent, or Firm—Lowe, Price, LeBlanc, Becker & Shur

[57] ABSTRACT

A method for manufacturing a porous body comprising zirconium oxide and a metal carbide is described. The method comprises mixing a metallic zirconium powder, a metal oxide, and a carbon powder, shaping the mixture in a desired form, and igniting a part or portion of the shaped mixture in an atmosphere inert to a combustion reaction of the shaped mixture. The combustion reaction is caused to continue by the heat of the reaction, so that the zirconium is converted to zirconium oxide, and the metal oxide is reduced with zirconium and converted to a metal carbide to obtain a porous body. This body may be readily divided into fine pieces. If the above procedure is effected under a molding compression pressure, a composite sintered product comprising zirconium oxide and the metal carbide is obtained.

31 Claims, No Drawings

METHOD FOR MANUFACTURING A POROUS MATERIAL OR A COMPOSITE SINTERED PRODUCT COMPRISING ZIRCONIUM OXIDE AND A CARBIDE

BACKGROUND OF THE INVENTION

1. Field of the Invention

This invention relates to a method for manufacturing a porous material comprising zirconium oxide and a carbide. The invention also relates to a composite sintered product comprising zirconium oxide and a carbide. The porous material or a powder mixture obtained by dividing the porous material, or the sintered product is suitable for use as carbide tools or high temperature structural materials.

2. Description of the Prior Art

For the manufacture of composite sintered products comprising zirconium oxide and carbides, it is the common practice to provide a carbide powder which has been obtained by mixing a metal or its oxide with a carbon powder or solid carbon and subjecting the mixture to reaction at high temperatures. The carbide powder is sufficiently mixed with a zirconium oxide powder and molded in a desired shape, and is sintered under high temperature and high pressure conditions. This process has inconveniently a number of steps and is complicated, so that impurities are liable to be incorporated in the final product. Another disadvantage involved in this process is a very high energy consumption.

SUMMARY OF THE INVENTION

It is, therefore, an object of the invention to provide a method for manufacturing a porous material comprising zirconium oxide and a carbide compound, which method is simple in operation and is relatively small in energy consumption, thus being economical.

It is another object of the invention to provide a method for manufacturing a porous material of the type mentioned above which comprises igniting or heating a portion or part of a green molding of a metallic zirconium powder, an oxide powder and a carbon powder so that the combustion reaction of or throughout the green molding is caused to proceed automatically by the heat of reaction.

It is a further object of the invention to provide a method for manufacturing a powder mixture obtained by dividing the porous material into fine pieces.

It is a still further object of the invention to provide a method for manufacturing a sintered product comprising zirconium oxide and a metal carbide by a simple procedure and in a reduced energy consumption.

The method according to the invention comprises mixing a metallic zirconium powder, a metal oxide powder and a carbon powder, shaping the mixture in a desired form, and igniting a portion of the shaped mixture in an atmosphere of a gas inert to a combustion reaction of the shaped mixture so that the combustion reaction caused by the ignition starts in the portion and continues throughout the shaped mixture by the heat of the reaction, thereby converting the metallic zirconium powder to zirconium oxide and the metal oxide powder to a metal carbide to obtain a porous body substantially made of the zirconium oxide and the metal carbide. This body may be readily divided into a fine powder by a usual manner using, for example, a ball mill. If the ignition of the shaped mixture is effected under molding compression pressure under which the combustion reaction is caused to proceed throughout the shaped mixture, a composite sintered product can be readily obtained.

DETAILED DESCRIPTION AND EMBODIMENTS OF THE INVENTION

In the method of the invention, starting powders are first provided including a metallic zirconium powder, a metal oxide powder, and a carbon powder. These powders should preferably have small sizes for facilitating the chemical reaction upon combustion of the starting powders. However, if high mechanical strength is desired, the reaction should be caused to proceed slowly. For this purpose, too small sizes are not desirable. Preferably, the average size is selected from the following ranges depending on the purpose of a final product, i.e. below 200 micrometers for the metallic zirconium powder, below 20 micrometers for the metal oxide, and below 50 micrometers for the carbon powder.

These powders are uniformly mixed by a suitable means such as a ball mill, an attrition mill or the like. The mixture is subsequently molded in a desired form by a press molding or other known techniques. For the molding, binders may be used to keep the shape of the molding. These binders must be those which can evaporate or burn out during a subsequent combustion reaction. Such a binder may be, for example, polyvinyl alcohol in the form of an aqueous solution, but the mixture can be molded without use of any binders. If used, the amount of the binder is from 1 to 5 wt% based on the powder mixture.

The molding is finally heated or ignited at a part or portion thereof to such an extent that the combustion or conversion reaction takes place at the portion among the zirconium powder, the metal oxide powder and the carbon powder. This combustion or conversion reaction continues, without further application of heat from outside, by the heat generated by the combustion reaction until all the starting materials substantially take part in the conversion reaction. The reaction should be effected in an atmosphere of a gas which is inert to the chemical or conversion reaction. In practice, argon is used for this purpose although other inert gases may be used. In this connection, however, nitrogen should not be used or contained in the atmosphere because zirconium and/or the metal in the metal oxide are very likely to react with nitrogen, particularly at high temperatures, to form a nitride or nitrides. The heating or ignition of the part of the green molding by which the combustion or chemical reaction is caused to proceed is effected, for example, by energizing an electric heater embedded or provided, for example, in the part of the green molding. Prior to the ignition, the atmosphere surrounding the molding or the reaction system may be maintained at room temperature or may be heated to a suitable level of a temperature, for the example, of not lower than 400° C. in order to facilitate the combustion reaction, which depends on the types of starting materials. For instance, when silicon dioxide is used as the metal oxide, the heat of the reaction is so small that the reaction system should preferably by heated to about 500° C. In an extreme case where the heat of the reaction is great, the system may be cooled.

The reactions between Zr, a metal oxide and carbon proceed as follows, when using, for example, $TiO_2$ as the metal oxide:

$$Zr + TiO_2 + nC \rightarrow ZrO_2 + TiC_n$$

in which n is a value up to 1. As will seen from the above formula, the $TiO_2$ is reduced with Zr and the reduced Ti metal, which is considered to be melted, reacts with C to form titanium carbide. Although Zr does rarely suffer oxidation at normal temperatures, it is rapidly oxidized when heated. On the other hand, the titanium metal reduced by the zirconium is likely to convert into a nitride if nitrogen is present in the atmosphere. Accordingly, nitrogen should not be contained in the atmosphere. Titanium can form carbides having a C to Ti ratio of 0:1 to 1:1. Accordingly, the ratio of carbon to Ti may vary within a range up to 1. Preferably, the ratio is in the range of 0.5:1 to 1:1 in order to impart high mechanical strength to the resultant carbide.

The reduction reaction between Zr and a metal oxide proceeds stoichiometrically with respect to the Zr and the oxygen atoms contained in the metal oxide and results in formation of $ZrO_2$. The metal in the metal oxide may be a variety of metals whose oxides are capable of being reduced with zirconium under high temperature conditions and the reduced metal can form a carbide by reaction with carbon. Such metal oxides include, for example, oxides of titanium, niobium, silicon, vanadium and the like. In view of the practical utility as a final composite material and the ease in the combustion reaction which is essential in the method of the invention, titanium, niobium and silicon oxides are preferred. Specific examples of the titanium, niobium and silicon oxides include titanium dioxide, dititanium trioxide, niobium pentaoxide, silicon dioxide and the like. Of these, titanium oxides are most preferable.

The heat necessary for the combustion reaction after the ignition is generated by the reduced reaction and the reaction between the reduced metal and the carbon, by which the reaction mixture comprising zirconium, a metal oxide and carbon may be heated up to about 2000° C.

Aside from zirconium, aluminum which can reduce the metal oxide may be further added to the powder mixture. In the case, the resultant material will comprise aluminum oxide as well as zirconium oxide and a metal carbide such as titanium or niobium carbide. When aluminum is added, the resultant oxides have finer sizes with an increase of mechanical strength. Aluminum may be used in the form of an alloy with zirconium, or as a separate powder.

In order to permit once formed zirconium oxide to be stabilized, it is preferred to preliminarily add stabilized zirconium oxide to the starting powder mixture. The molar ratio of the stabilized zirconium oxide to metallic zirconium is up to 0.1:1. For the stabilization, yttrium, magnesium or the like may be used. These metals may be added as a separate metal, and are left in a final porous as a kind of solid solution with zirconia, by which zirconia is stabilized. In general, zirconium oxide or zirconia has two crystal forms of the monoclinic system and the tetragonal system. In the stabilized form, the tetragonal system becomes predominant with better mechanical strength.

If necessary, the porous body obtained according to the invention may be milled such as in a ball mill, an attrition mill, and the like, thereby obtaining a mixed powder material of zirconium oxide and a metal carbide. The milling usually results in smaller particle sizes of the respective powders than the sizes of the starting powders.

It will be noted that the carbon used as one of the starting materials may be any carbons having a size defined before. Conveniently, carbon black obtained from acetylene is used for this purpose because of the high purity thereof.

If the combustion reaction of the starting powders is conducted under compression molding pressure, the green molding is sintered by the heat generated during the combustion reaction while converting the zirconium into zirconium oxide and the reduced metal into a corresponding metal oxide. The compression molding pressure is not critical and depends on the density required for a final sintered product. Under the compression molding pressure, the combustion reaction can also proceed smoothly as in the case using no pressure. In the resultant sintered product, zirconium oxide has a mixture of crystal forms including a tetragonal system and a monoclinic system. When sintered under pressure, the starting powders are shrunk during the combustion reaction. It is convenient to use a press which is designed to follow the shrinkage. For this purpose, there is used, for example, by a uniaxial hot press having a piston and a pad supported with an elastic member at one end of the pad. When the molding has been shrunk during the combustion reaction, the elastic member which has also been compressed to an extent can follow the shrinkage because of its elasticity. The material for such an elastic member may be urethane rubber.

All the procedures, materials and additives involved in the manufacture of the porous material or composition described before may be similarly used for the manufacture of the sintered product, including the addition of stabilized zirconium oxide, the addition of aluminum, and the like.

The present invention is more particularly described by way of examples.

EXAMPLE 1

Starting powders including a zirconium powder having a size not larger than 10 micrometers, a titanium oxide ($TiO_2$) powder having an average size of 1 micrometer, and carbon black obtained from acetylene were mixed in molar ratios of 1:1:0.95. The resultant mixture was press-molded in the form of a column having a diameter of 20 mm and a height of 20 mm. The column molding was ignited at a portion thereof by energizing a tungsten filament provided at a lower portion of the molding. When the filament was energized by application of an electric current at room temperature in an atmosphere of argon, the conversion reaction started and continued until a porous body was obtained. This porous body was powdered by the use of a ball mill and subjected to the X-ray diffraction analysis, revealing the existence of titanium carbide and zirconium oxide alone from the diffraction pattern. The mixed powders had, respectively, a size of from 0.2 to 0.3 micrometers, which were smaller than those of the starting powders.

The chemical or conversion reaction in the above process is considered to proceed as follows.

$$Zr + TiO_2 + 0.95C \rightarrow ZrO_2 + TiC_{0.95}$$

In the above reaction, it is considered that $TiO_2$ is first reduced with Zr and the reduced Ti metal, which is assumed to be melted, reacts with C to form $TiC_{0.95}$.

The heat of the reaction is very high, so that the sample is self-heated to a high temperature of about 2000° C. Thus, any further application of heat from outside is not necessary after the ignition. As a result, the molding is entirely converted into $ZrO_2$ and $TiC_{0.95}$.

EXAMPLE 2

A zirconium powder having a size not larger than 10 micrometers, sintered amorphous silicon dioxide (Carplex CS-5, made by Shionogi Seiyaku K.K.) and carbon black obtained from acetylene were mixed in molar ratios of 1:1:2, followed by repeating the general procedure of Example 1 except that the combustion reaction started after heating the atmosphere to 500° C. The resultant porous body was milled and heated to 700° C. so that unreacted carbon black was burnt. Thereafter, the mixed powder was identified by the X-ray diffraction analysis, revealing the existence of silicon carbide and zirconium oxide alone from the diffraction pattern. The sizes of the respective powders were in the range of 0.1 to 0.5 micrometers, which were smaller than the sizes of the starting powders.

EXAMPLE 3

A zirconium and magnesium alloy powder having a size not larger than 325 mesh and a Mg content of 5 mole%, a niobium pentaoxide ($Nb_2O_5$) powder having an average size of 1 micrometer, carbon black obtained from acetylene, and a zirconium oxide powder stabilized with 5 mole% of magnesium and having an average size of 0.5 micrometers were mixed in molar ratios of 2:0.78:1.45:0.1. The mixture was treated substantially in the same manner as in Example to to obtain a composite powder. This powder was identified by the X-ray diffraction analysis, revealing that niobium carbide and zirconium oxide alone existed, from which it was assumed that the magnesium involved was included in the zirconium oxide for its stabilization. The respective powders of the niobium carbide and the zirconium oxide had a size of 0.2 to 0.4 micrometers.

EXAMPLE 4

A zirconium powder having a size not larger than 10 micrometers, a dititanium trioxide ($Ti_2O_3$) powder having an average size of 3 micrometers and carbon black obtained from acetylene were weighed in molar ratios of 3:2.075:3.9, to which yttrium was added in an amount of 5 mole% based on the zirconium. The mixture was treated substantially in the same manner as in Example 1 to obtain a composite or mixed powder. This powder was identified with the X-ray diffraction analysis, revealing the existence of only titanium carbide and zirconium oxide stabilized with the yttrium. The sizes of the respective powders were in the range of from 0.3 to 0.5 micrometers, which were smaller than those of the starting powders.

EXAMPLE 5

A zirconium powder having a size not larger than 10 micrometers, an aluminum powder having a size not larger than 10 micrometers, a titanium dioxide ($TiO_2$) powder having an average size of 1 micrometer, and carbon black obtained from acetylene were mixed in ratios of 0.2:1.6:1.4:1.26, followed by repeating the general procedure of Example 1. The resultant porous body was milled in the form of a mixed powder and identified with the X-ray diffraction analysis, revealing the existence of titanium carbide, zirconium oxide and aluminum oxide alone. The respective powders in the mixed powder had a size of from 0.1 to 0.2 micrometers, which were significantly smaller than the sizes of the starting powders.

EXAMPLE 6

A zirconium powder having a size not larger than 10 micrometers, an aluminum powder having a size not larger than 10 micrometers, a niobium pentaoxide ($Nb_2O_5$) having an average size of 1 micrometer, and carbon black obtained from acetylene were mixed in molar ratios of 0.4:1.2:0.52:1, followed by treating the mixture in the same manner as in Example 1. The resultant porous body was milled and identified with the X-ray diffraction analysis, revealing the existence of niobium carbide, zirconium oxide and aluminum oxide alone. The sizes of the respective powders, as mixed, were in the range of from 0.1 to 0.2 micrometers, which are smaller than the sizes of the starting materials.

EXAMPLE 7

A zirconium and yttrium alloy powder having a size not larger than 325 mesh and a content of yttrium of 5 mole%, an aluminum powder having a size of not larger than 10 micrometers, a niobium pentaoxide powder having an average size of 1 micrometer, carbon black obtained from acetylene, and a zirconium oxide powder stabilized with yttrium and having an average size of 0.5 micrometers were mixed in molar ratios of 0.2:1.6:0.559:1.118:0.1, followed by treating substantially in the same manner as in Example 1. The resultant porous body was milled and identified with the X-ray diffraction analysis, revealing the existence of niobium carbide, zirconium oxide and aluminum oxide alone. The sizes of the mixed powders were, respectively, in the range of from 0.1 to 0.5 micrometers, which were smaller than those of the starting materials.

EXAMPLE 8

A zirconium powder having a size not larger than 10 micrometers, an aluminum powder having a size not larger than 10 micrometers, a dititanium trioxide ($Ti_2O_3$) powder having an average size of 3 micrometers, and carbon black obtained from acetylene were mixed in molar ratios of 0.6:0.8:0.8:1.44, followed by treating the mixture substantially in the same manner as in Example 1 except that the molding was ignited after heating to 200° C. The resultant porous body was milled and identified by the use of the X-ray diffraction analysis, revealing the existence of titanium carbide, zirconium oxide and aluminum oxide alone. The sizes of the respective powders were in the range of from 0.3 to 0.5 micrometers, which were smaller than the sizes of the starting powders.

EXAMPLE 9

A zirconium powder having a size not larger than 10 micrometers, a titanium oxide powder having an average size of 1 micrometer, and carbon black obtained from acetylene were mixed in molar ratios of 1:1:0.95 and press molded in the form of a column having a diameter of 10 mm and a height of 10 mm. The molding was placed in a silicon carbide mold and was sintered simultaneously with the chemical conversion by the use of a uniaxial vacuum hot press having a urethane rubber elastic member. The molding had a tungsten filament at a lower portion thereof. The reaction started by energization of the filament at room temperature in an atmosphere of argon under a pressure of 50 MPa. The resultant sintered product was identified with the X-ray diffraction analysis, revealing the existence of titanium carbide and zirconium oxide of a tetragonal system and a monoclinic system from the diffraction pattern. The ratio of the tetragonal and monoclinic systems was found to be about 1:1. The sintered product had a density of 5.25 g/cm$^3$.

The chemical reaction formula of the above process proceeds as is particularly shown in Example 1, in which TiO$_2$ is reduced with metallic zirconium and the reduced titanium reacts with carbon. Since the heat of the reaction is great, the molding is heated to a high temperature of about 2000° C. In addition, the molding is pressed through the urethane rubber member, the formed ZrO$_2$ particles and the TiC$_{0.95}$ particles are sintered to obtain a composite sintered product composed of ZrO$_2$ and TiC$_{0.95}$.

EXAMPLE 10

A zirconium powder having a size not larger than 10 micrometers, a dititanium trioxide powder having an average size of 3 micrometers, and carbon black obtained from acetylene were mixed in molar ratios of 3:3:3.8, followed by treating substantially in the same manner as in Example 9 except that the reaction started after heating the mixture to 300° C. The resultant sintered product was identified with the X-ray diffraction analysis, revealing the existence of titanium carbide and zirconium oxide of the tetragonal and monoclinic systems. From the X-ray diffraction pattern, the ratio of the tetragonal and monoclinic systems was found to be approximately 1:1. The sintered product had a density of 5.28 g/cm$^3$.

EXAMPLE 11

A zirconium and magnesium alloy powder having a size not larger than 325 mesh and a content of magnesium of 5 mole%, a niobium pentaoxide (Nb$_2$O$_5$) powder having an average size of 1 micrometer, and carbon black obtained from acetylene were mixed, to which a zirconium oxide powder stabilized with 5 mole% of magnesium and having an average size of 0.5 micrometers was added. The molar ratios of the alloy powder, the niobium pentaoxide powder, the carbon black and the zirconium oxide were 2:0.78:1.48:0.1. After mixing, the mixture was treated in the same manner as in Example 9. The resultant sintered product was identified with the X-ray diffraction analysis, revealing the existence of niobium carbide and zirconium oxide alone. The sintered product had a density of 6.33 g/cm$^3$.

EXAMPLE 12

A zirconium powder having a size not larger than 10 micrometers, an aluminum powder having a size not larger than 10 micrometers, a titanium dioxide powder having an average size of 0.7 micrometers, and carbon black obtained from acetylene were mixed in molar ratios of 0.8:0.4:1.1:0.99, and were treated substantially in the same manner as in Example 9. The resultant sintered product was identified by the use of the X-ray diffraction analysis, revealing the existence of titanium carbide, aluminum oxide and zirconium oxide in which approximately 90% was a tetragonal system with the balance of the monoclinic system.

These mixed powders or composite sintered products thereof are very suitable for use as a substrate of a thin film magnetic head and a material for tools.

What is claimed is:
1. A method for manufacturing a porous material comprising zirconium oxide and a metal carbide, comprising
    mixing a zirconium alloy powder, a metal oxide powder and a carbon powder, wherein the zirconium alloy is an alloy of zirconium and aluminum, yttrium or magnesium;
    shaping the mixture in a desired form; and
    igniting a portion of the shaped mixture in an atmosphere which is inert to a combustion reaction of the shaped mixture so that the combustion reaction starts in said portion of said mixture and continues throughout the shaped mixture by the heat of the reaction, wherey the zirconium alloy powder is converted to a solid solution comprising zirconia and the metal oxide powder is converted to a metal carbide throughout the shaped mixture to attain a porous body substantially made of the zirconia solid solution and the metal carbide.
2. The method according to claim 1, further comprising
    adding a binder in the mixing step in an amount of about 1 to 5 wt% of the total amount of the powders.
3. The method according to claim 2, wherein
    said binder is polyvinyl alcohol and is provided in the form of an aqueous solution.
4. The method according to claim 1, wherein
    the metal oxide powder is mixed with the zirconium alloy powder and is selected from the group consisting of titanium oxides/niobium oxide and the carbon powder silicon oxide.
5. The method according to claim 4, wherein said metal oxide is a titanium oxide.
6. The method according to claim 5, wherein said titanium oxide is titanium dioxide.
7. The method according to claim 5, wherein said titanium oxide is dititanium trioxide.
8. The method according to claim 4, wherein said metal oxide is niobium pentaoxide.
9. The method according to claim 4, wherein said metal oxide is silicon dioxide.
10. The method according to claim 1, wherein said zirconium alloy powder further comprises magnesium.
11. The method according to claim 1, wherein
    the powder mixture further comprises an element for stabilizing the zirconium oxide.
12. The method according to claim 11, wherein said element is yttrium.
13. The method according to claim 1, wherein said mixture further comprises zirconium oxide stabilized with yttrium.
14. The method according to claim 1, further comprising
    adding to the mixture an aluminum powder, whereby aluminum oxide is contained in the porous body.
15. The method according to claim 1, wherein said porous body is divided into fine pieces in the form of a mixture of said zirconium oxide and said metal carbide.
16. The method according to claim 1, wherein said carbon powder is carbon black obtained from acetylene.
17. A method for manufacturing a composite sintered product comprising zirconium oxide and a metal carbide, comprising
    mixing a zirconium alloy powder, a metal oxide powder and a carbon powder, wherein the zirconium alloy is an alloy or zirconium and aluminum, yttrium or magnesium;

shaping the mixture in a desired form; and igniting, under molding compression pressure, a portion of the shaped mixture in an atmosphere which is inert to the combustion of the shaped mixture so that the combustion reaction starts in the portion of the mixture and continues throughout the shaped mixture by the heat of the reaction, whereby the zirconium alloy powder is converted to a solution comprising zirconia and the metal oxide powder is converted to a metal carbide throughout the shaped mixture to attain a sintered product substantially made of the zirconia solid solution and the metal carbide.

18. The method according to claim 17, further comprising adding a binder in the mixing step in an amount of about 1 to 5 wt% of the total amount of the powders.

19. The method according to claim 18, wherein the binder is polyvinyl alcohol and is provided in the form of an aqueous solution.

20. The method according to claim 17, wherein the metal oxide powder is selected from the group consisting of titanium oxides, niobium oxide and silicon oxide.

21. The method according to claim 20, wherein said metal oxide is a titanium oxide.

22. The method according to claim 21, wherein said titanium oxide is titanium dioxide.

23. The method according to claim 21, wherein said titanium oxide is dititanium trioxide.

24. The method according to claim 20, wherein said metal oxide is niobium pentaoxide.

25. The method according to claim 20, wherein said metal oxide is silicon dioxide.

26. The method according to claim 17, wherein said metallic zirconium powder further comprises magnesium.

27. The method according to claim 17, wherein said mixture further comprises an element for stabilizing the zirconium oxide.

28. The method according to claim 27, wherein said element is yttrium.

29. The method according to claim 17, wherein said mixture further comprises zirconium oxide stabilized with yttrium.

30. The method according to claim 17, further comprising adding to said mixture an aluminum powder, whereby aluminum oxide is contained in the porous body.

31. The method according to claim 17, wherein said carbon powder is carbon black obtained from acetylene.

* * * * *